(12) United States Patent
Joo (10) Patent No.: US 7,044,713 B2
(45) Date of Patent: May 16, 2006

(54) WIND POWER GENERATOR WITH MULTIPLE ROTARY WINGS

(76) Inventor: Jang-sik Joo, 435-3, Deokjin-dong 5Ga, Deokjin-gu, Jeonju-si, Jeollabuk-do, 561-852 (KR)

( * ) Notice: Subject to any disclaimer, the term of this patent is extended or adjusted under 35 U.S.C. 154(b) by 0 days.

(21) Appl. No.: 10/513,771

(22) PCT Filed: Dec. 28, 2002

(86) PCT No.: PCT/KR02/02477

§ 371 (c)(1),
(2), (4) Date: Jan. 21, 2005

(87) PCT Pub. No.: WO03/102410

PCT Pub. Date: Dec. 11, 2003

(65) Prior Publication Data

US 2005/0118027 A1    Jun. 2, 2005

(30) Foreign Application Priority Data

May 31, 2002  (KR) ................. 10-2002-0030577

(51) Int. Cl.
*F03D 1/02*    (2006.01)

(52) U.S. Cl. .................. 416/201 A; 416/51; 416/136; 416/175; 416/176; 416/203; 290/55

(58) Field of Classification Search .............. 416/41, 416/44, 48, 51, 136, 175, 176, 201 R, 201 A, 416/203; 290/44, 55; 415/4.3, 4.5, 908

See application file for complete search history.

(56) References Cited

U.S. PATENT DOCUMENTS

| | | | | |
|---|---|---|---|---|
| 1,504,259 A | * | 8/1924 | Miller | 416/201 A |
| 1,713,866 A | * | 5/1929 | D'Asseler | 416/44 |
| 1,920,880 A | * | 8/1933 | Parker | 416/175 |
| 2,029,503 A | * | 2/1936 | Peterson | 416/136 |
| 2,472,357 A | * | 6/1949 | Wolf | 416/175 |
| 4,087,196 A | * | 5/1978 | Kronmiller | 415/4.5 |
| 4,116,585 A | * | 9/1978 | Maracic | 416/41 |
| 4,421,967 A | * | 12/1983 | Birgel et al. | 290/55 |
| 5,599,168 A | * | 2/1997 | Lund | 416/136 |
| 6,375,427 B1 | * | 4/2002 | Williams et al. | 416/175 |
| 6,612,804 B1 | * | 9/2003 | Su | 416/176 |

FOREIGN PATENT DOCUMENTS

| | | | | | |
|---|---|---|---|---|---|
| FR | 2624212 A | * | 6/1989 | | 416/41 |
| JP | 57-83670 A | * | 5/1982 | | 416/41 |
| JP | 59-126084 | | 7/1984 | | |
| JP | 62-197672 | | 9/1987 | | |
| JP | 2000-220561 | | 8/2000 | | |

* cited by examiner

*Primary Examiner*—Christopher Verdier
(74) *Attorney, Agent, or Firm*—Ladas & Parry LLP (57) ABSTRACT

A wind power generating apparatus having a plurality of rotary wings can reduce the load and resistance on the rotary wings due to wind to obtain a highly effective rotation power as well as to flexibly absorb the impact applied to the rotary wings due to varying wind pressure. Each one of the rotary wings has a radius of rotation different from the others and rotates separately according to the direction of the wind, by which the rotation power resulting from load and resistance in the integrally elongated rotary wings in relation to the wind is prevented from being canceled, and the wind acceleration via the accelerator covers and the wind distribution to the rotary wings result for highly efficient rotation power. The impact on the rotary wings is elastically absorbed while supporting the rotary wings so that the rotary wings can gradually rotate according to the intensity of the wind without damage

2 Claims, 11 Drawing Sheets

WIND POWER GENERATOR WITH MULTIPLE ROTARY WINGS

TECHNICAL FIELD

The present invention relates to a wind power generating apparatus having a plurality of rotary wings. In particular, the present invention is directed to a wind power generator with multiple rotary wings in which load and resistance on the wind generated in the rotary wing are reduced to obtain a high efficiency rotation power and flexibly absorb impact applied to the rotary wing according to variation of wind pressure.

BACKGROUND ART

In general, electric power generations can be classified into hydroelectric power generation using head drop of water, thermal power generation which obtains electric power by means of combustion of fuel, nuclear power generation using nuclear fission and wind power generation using wind. A proper power generator is established considering season and geographic influence to obtain electric power.

Figure 11:
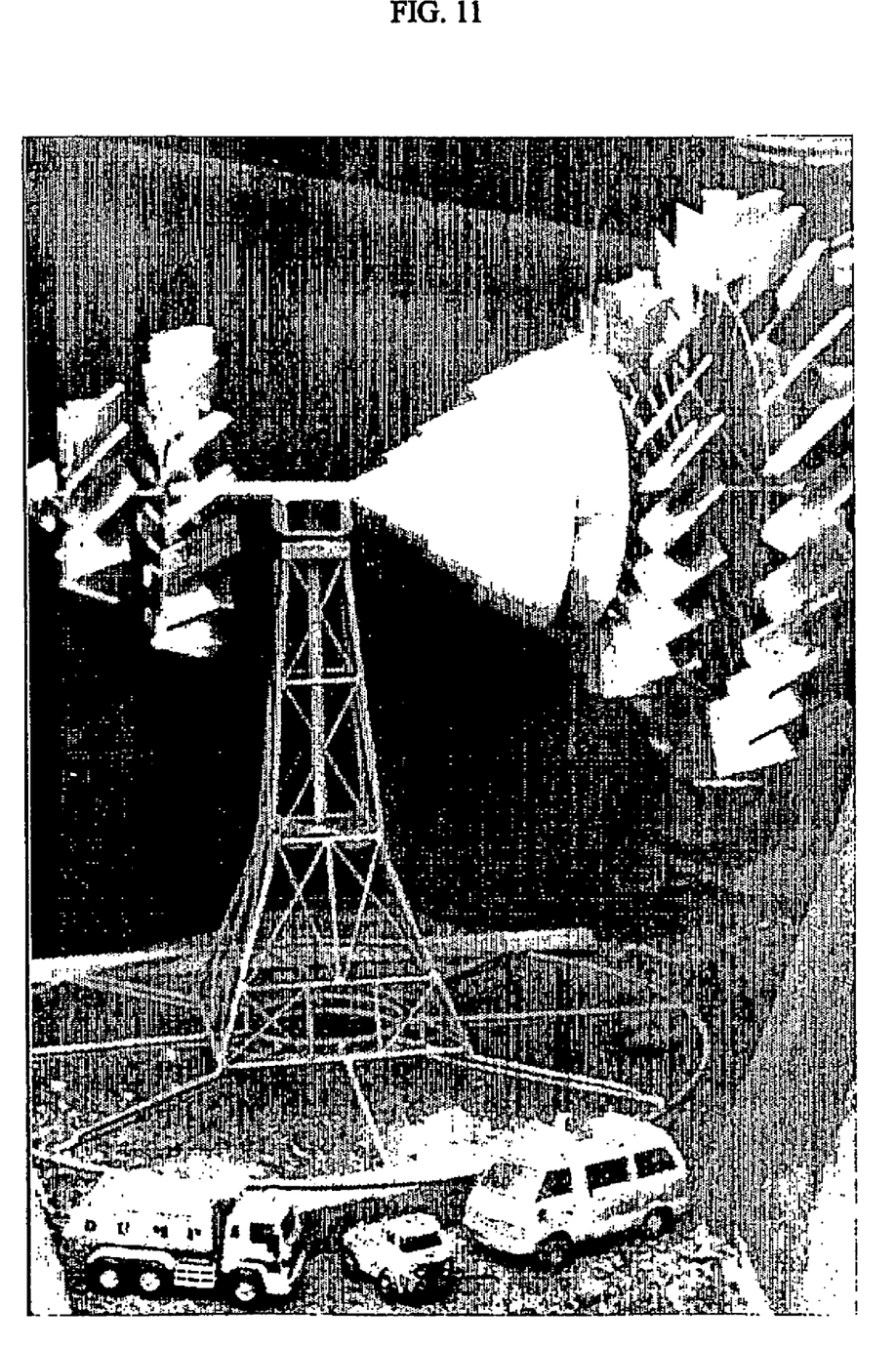
FIG. 11 is a perspective view of a conventional wind power generating apparatus.
Figure 12:
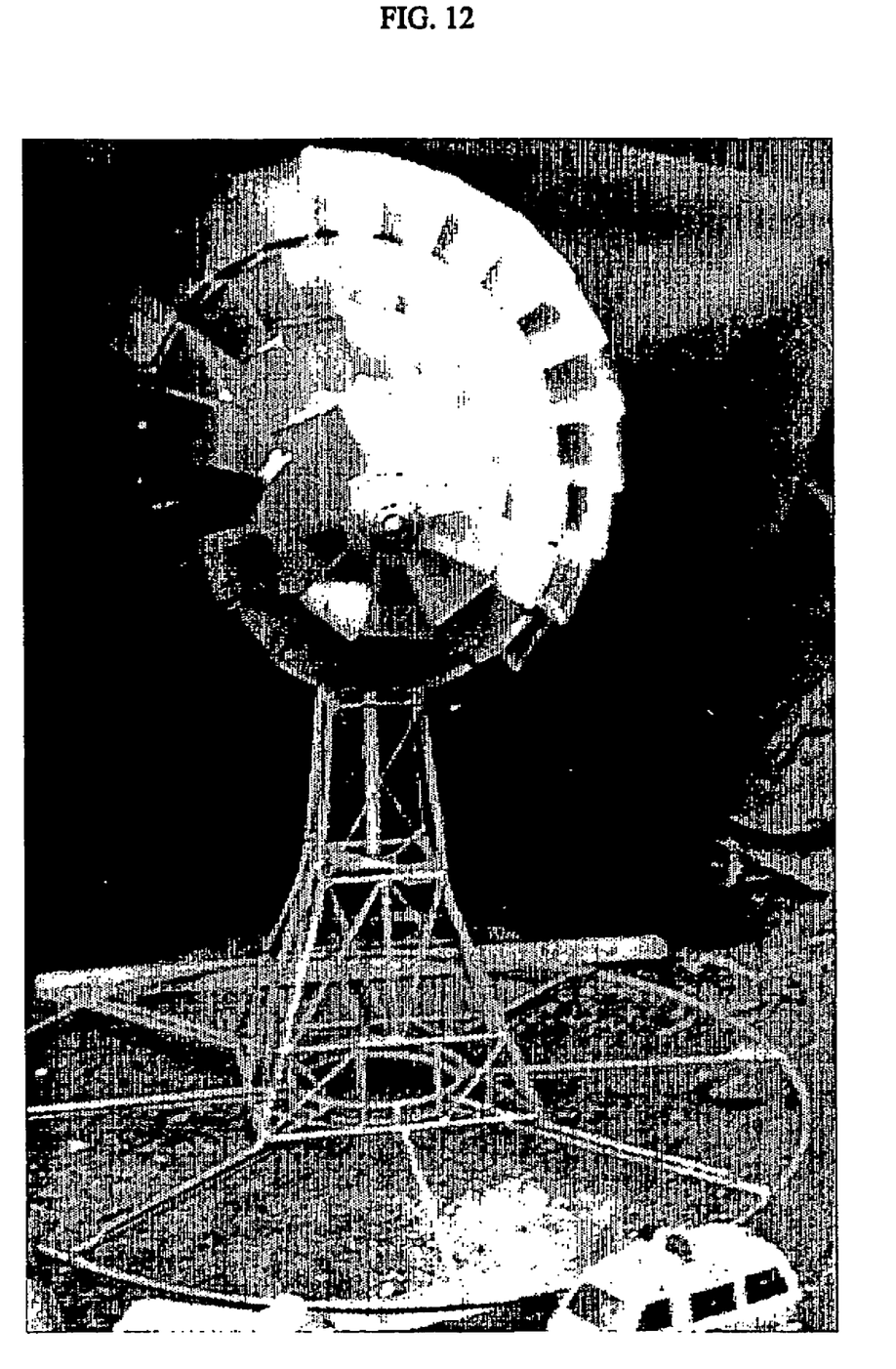
Figure 13:
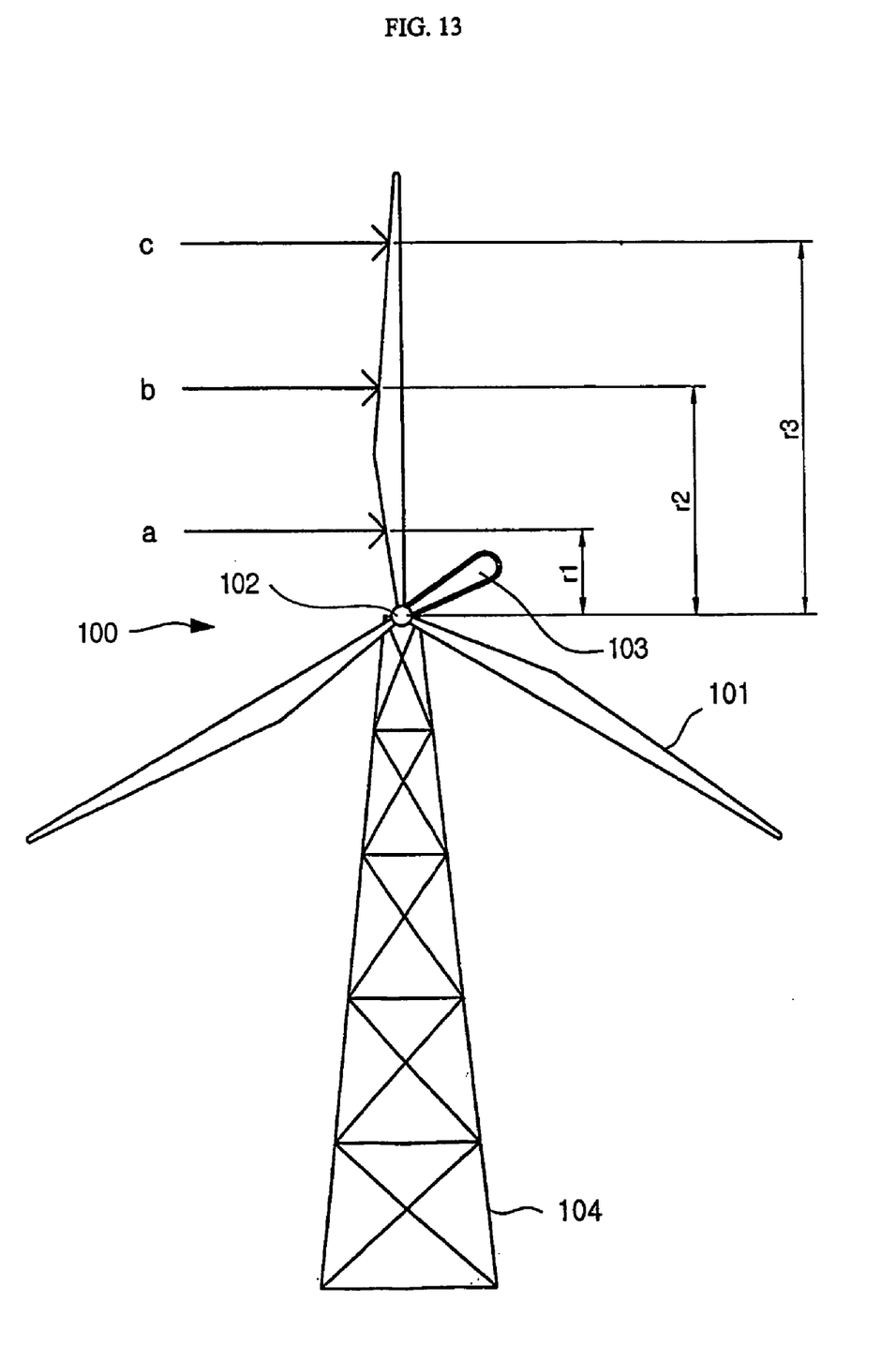

Among these power generations, wind power generation produces electric power utilizing natural wind and has advantages in that installation cost is inexpensive unlike other power generating plants, and further the wind power generation can be performed individually in a unit of home or local community. An example of conventional wind power generating apparatus is shown in FIG. 11.

As shown in FIG. 13, the conventional wind power generating apparatus 100 includes wings 101 that rotate by the wind, a generator 103 for generating electric power from the rotational force of the wings 101 and a support frame 104 for supporting both the generator 103 and the rotary wings 101.

The rotary wings 101 are extended from the rotary shaft 102. To this end, when the rotary wings 101 rotate by the wind blowing into them, the rear side of the rotary wings 101 is subjected to a large resistance or load and thus the rotational force of the rotary wings 101 can be cancelled. As a result, there exists a problem that the conventional use of wind power yields low efficiency.

That is, where the wind blowing to one the rotary wings 101 is divided into three directions a, b and c, and three points $r_1$, $r_2$ and $r_3$ correspond to the directions of the wind, it is apparent that rotation power is varied according to radii of rotation. In particular, the variation increases as the rotary wing 101 is longer, and resistance in the rear portion of the rotary wing increases as the rotary wing extends to the point $r_3$. As a result, this structure cancels a large portion of rotation power.

Further, the conventional apparatus does not have any means for concentrating irregular wind to the rotary wings 101 and thus fails to efficiently use the wind. When a strong wind blows e.g. owing to storm or blast, the rotary wings 101 is overloaded resulting from excessive rotation thereby causing frequent malfunction to the wind power generating apparatus.

DISCLOSURE OF THE INVENTION

The present invention has been made to solve the foregoing problems and it is therefore an object of the present Invention to provide a wind power generator comprising a plurality of rotary wings, which have radii of rotation different from one another and rotate separately according to the direction of the wind. The wind power generating apparatus of the invention can prevent canceling of rotation power resulting from load and resistance in the integrally elongated rotary wings in relation to the wind as well as accelerate the wind via accelerator covers and distribute the wind to rotary wings to obtain high efficient rotation power. Further, the Invention elastically absorbs impact on the rotary wings and support the rotary wings so that the rotary wings can gradually rotate according to the intensity of the wind in order to prevent damage of the wind power generating apparatus resulting from blast. Moreover, the wind power generating apparatus of the invention can enhance the efficiency of wind power generation as well as improve stability and operation reliability.

A wind power generating apparatus, comprises a plurality of rotary wings (such as 11a, 12a, 13a and 14a), a plurality of rotary shafts (such as 11, 12, 13, 14), an accelerator cover, wing piece support means, safety means, a transmission unit (such as 50), a generator (such as 60) for receiving the force from the transmission unit and generating electric power, a transmission unit housing (such as 50a) and a base frame (such as 70) for supporting the transmission unit housing.

Each rotary wing comprises a plurality of wing spokes and a plurality of wing pieces 16. Each wing spoke has a first spoke end and a second spoke end, and the length of each wing spoke is elongated therebetween. Each wing piece is connected to each of the second spoke ends. The lengths of all wing spokes in one rotary wing are substantially same. The lengths of all wing spokes in one rotary wing is, however, different from the lengths of the wing spokes in another one of the plurality of rotary wings.

Each rotary shaft has a first shaft end and a second shaft end and the length of the rotary shaft is elongated therebetween. All first spoke ends of each of the plurality of rotary wings are coupled to a respective one of the plurality of rotary shafts. The plurality of rotary shafts are elongated linearly by connecting the first end of one rotary shaft to the second end of another rotary shaft. The linearly elongated rotary shafts form a common axis for the plurality of rotary wings, such that the plurality of rotary wings rotate with respect to the common axis in response to an external force including wind applied to the rotary wing having the wing pieces.

One accelerator cover is connected to one of the two ends of the linearly elongated rotary shafts. The accelerator cover guides the external force in the form of wind to the wing pieces. The accelerator cover may be cone-shaped.

Wing piece support means 30 is connected to each wing piece for elastically supporting pivoting of the wing piece according to wind pressure variation;

Safety means is connected to each wing piece support means 30 for adjusting the angle of each wing piece according to the wind force being applied to the wing piece to prevent the wind from exerting excessive influence on the wing piece;

A transmission unit is connected to the linearly elongated rotary shafts via a gear train. The linearly elongate rotary shafts is capable of rotating together with the connected plurality of rotary wings in presence of external power including wind. The transmission unit transmits the force generated by the linearly elongated rotary shafts rotating.

A generator 60 is connected to the transmission unit via a generator shaft for receiving the force from the transmission unit and generates electric power;

A transmission unit housing 50a contains the transmission unit and the generator shaft 61.

A base frame 70 supports the transmission unit housing at a predetermined position.

Herein, each the first and second accelerator covers 20 and 21 preferably comprises tapered circular tubes 23 which are arranged in a pyramidal configuration to guide the wind respectively to the rotary wings 11a to 14a.

BRIEF DESCRIPTION OF THE DRAWINGS

The above and other objects, features and other advantages of the present invention will be more clearly understood from the following detailed description taken in conjunction with the accompanying drawings, in which.

<Description of symbols in main portions of the drawings>

| | |
|---|---|
| 11: First rotary shaft | 11a: First rotary wing |
| 12: Second rotary shaft | 12a: Second rotary wing |
| 13: Third rotary shaft | 13a: Third rotary wing |
| 14: Fourth rotary shaft | 14a: Fourth rotary wing |
| 15: Wing spoke | 15a: Extension piece |
| 16: Wing piece | 20: First accelerator cover |
| 21: Second accelerator cover | 22: Support member |
| 23: Circular tube | 30: Wing piece support means |
| 31: Support piece | 32: Fixing tube |
| 34: Hinge | 35: Movable rod |
| 36: Movable piece | 37: First spring |
| 38: Second spring | 40: Fixing member |
| 41: Steel wire movable member | 42: Steel wire |
| 43: Connector steel wire | 44: Rotor |
| 45: Rotor housing | 47: Elastic member |
| 48: Hinge shaft | 50: Transmission unit |
| 50a: Transmission unit housing | 51: First drive gear |
| 52: Second driver gear | 53: Third drive gear |
| 54: Fourth drive gear | 55: First rotatable driven gear |
| 56: Second rotatable driven gear | 57: Third rotatable driven gear |
| 58: Fourth rotatable driven gear | 59: Driven shaft |
| 60: Generator | 61: Shaft |
| 62: Bevel gear | 70: Base frame |

BEST MODE FOR CARRYING OUT THE INVENTION

The following detailed description will present a preferred embodiment of the invention in reference to the accompanying drawings.

Figure 1:
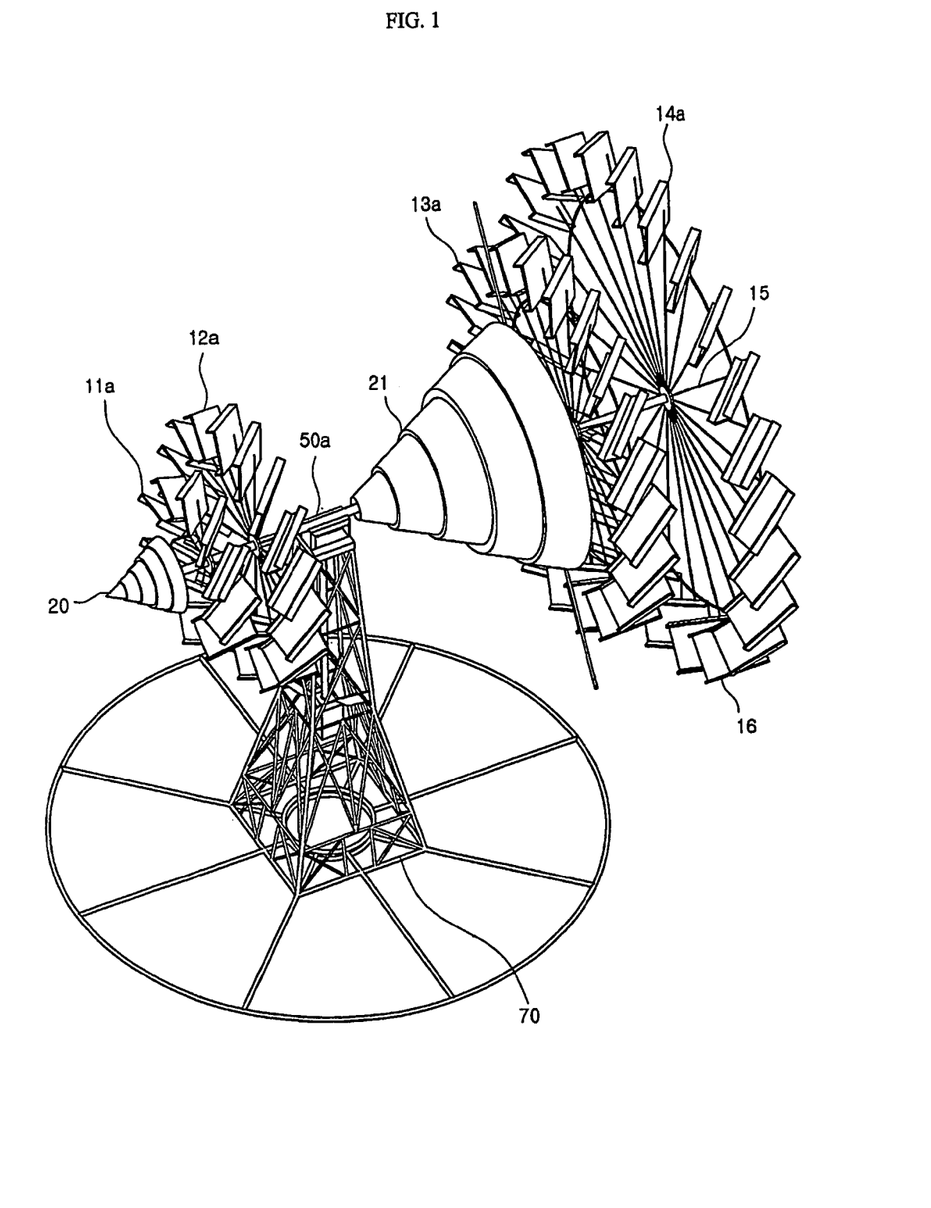
FIG. 1 is a perspective view of a wind power generating apparatus of the invention.
Figure 2:
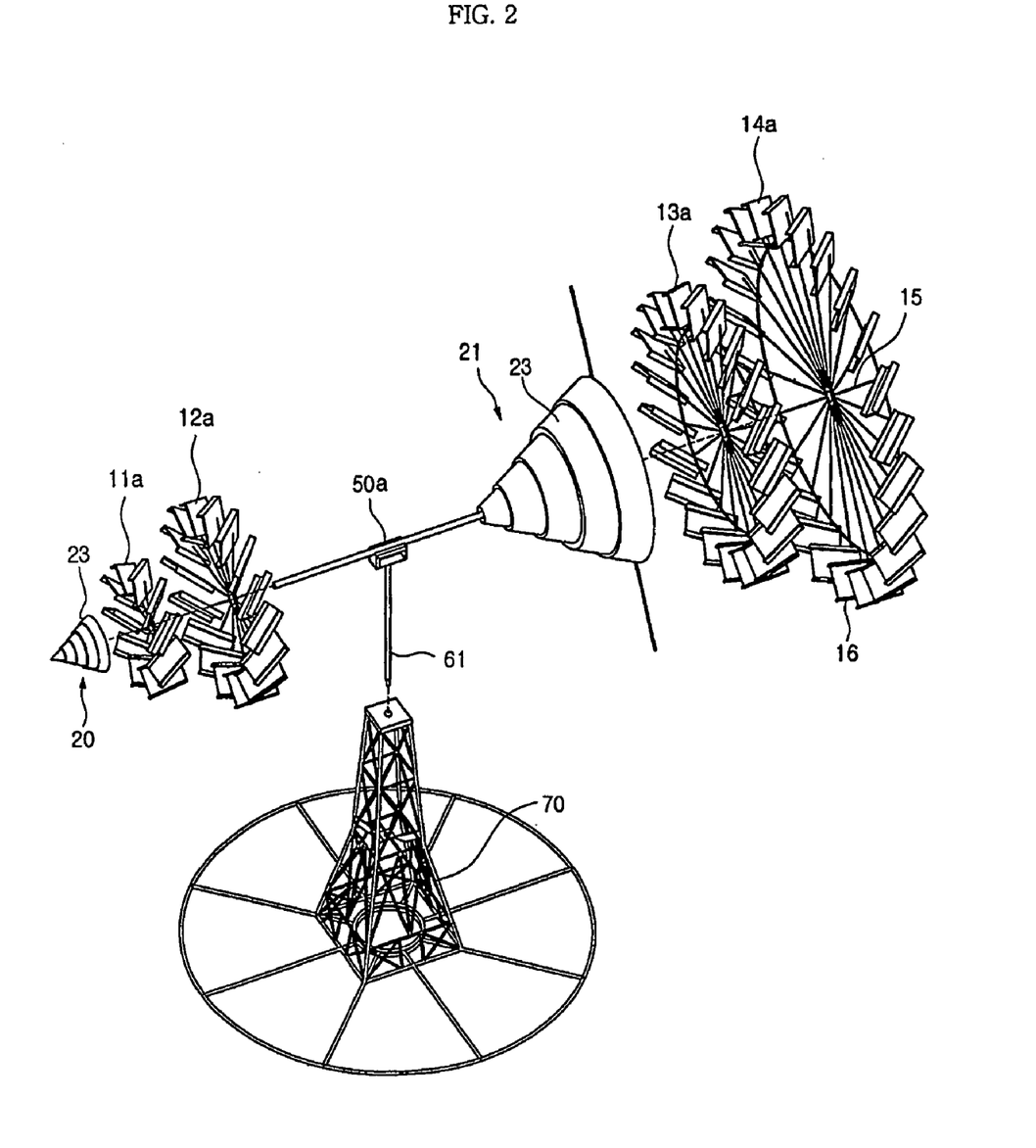
FIG. 2 is an exploded perspective view of the wind power generating apparatus of the invention.
Figure 3:
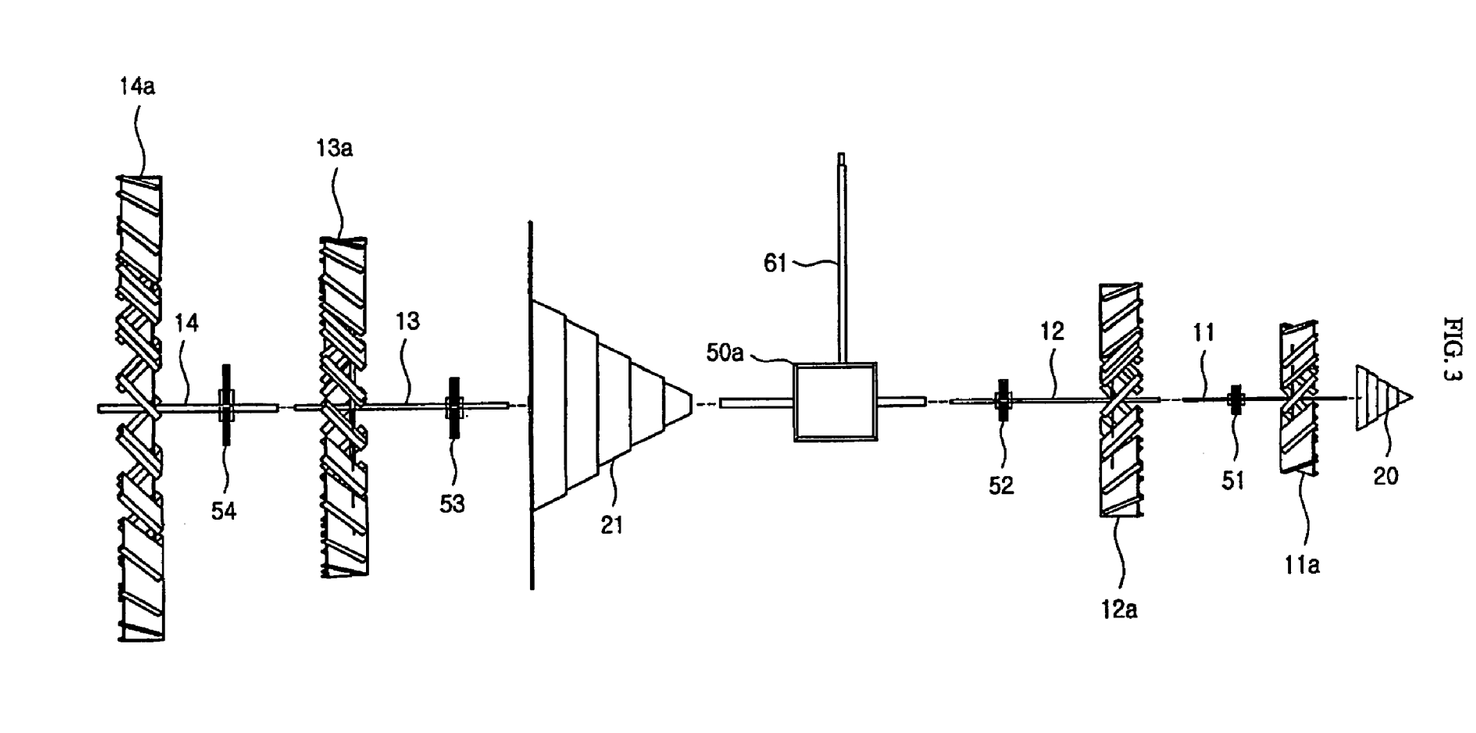
FIG. 3 is a partially expanded plan view of FIG. 2.
Figure 4:
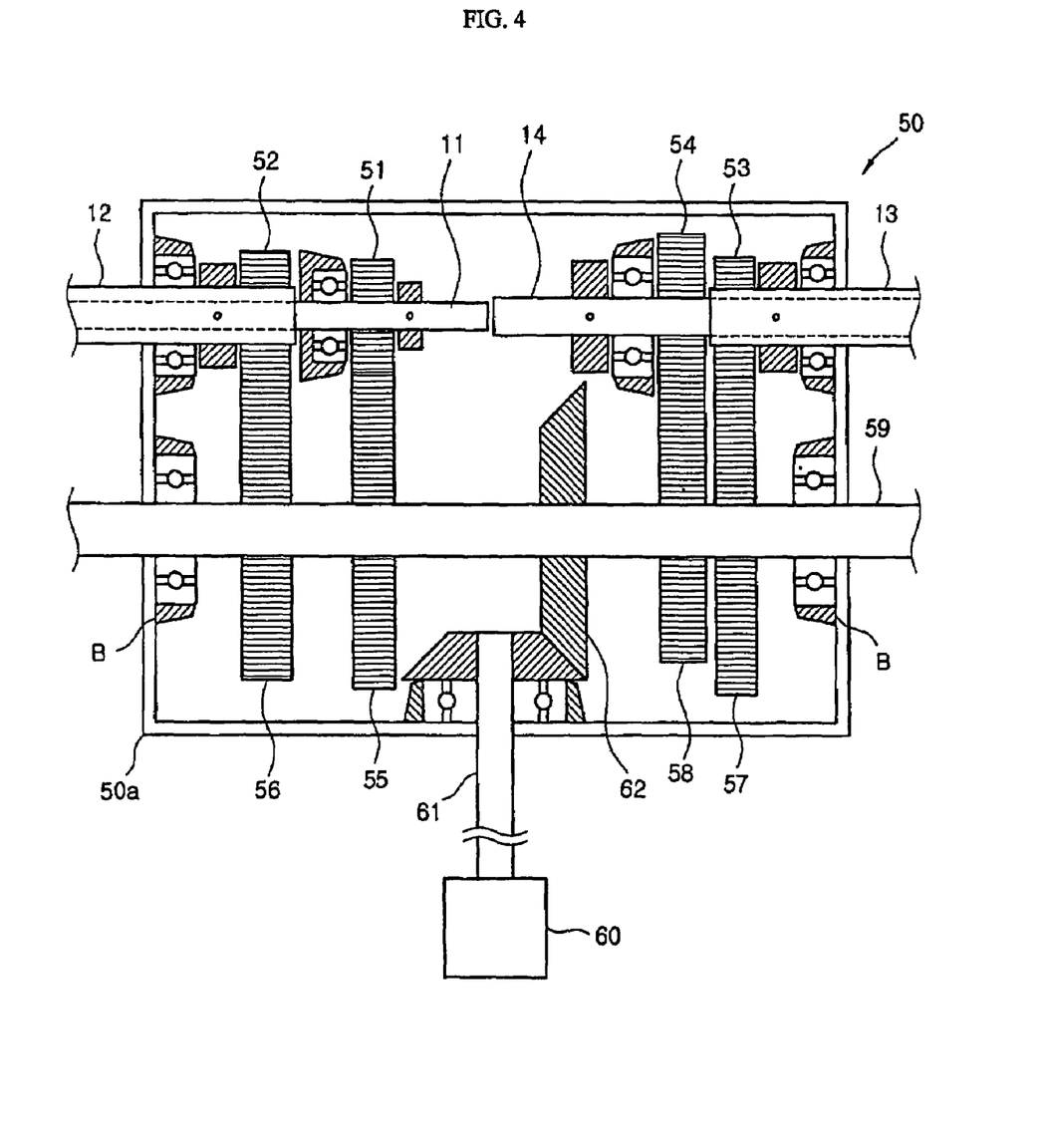
FIG. 4 is a transmission unit of the wind power generating apparatus of the invention.
Figure 5:
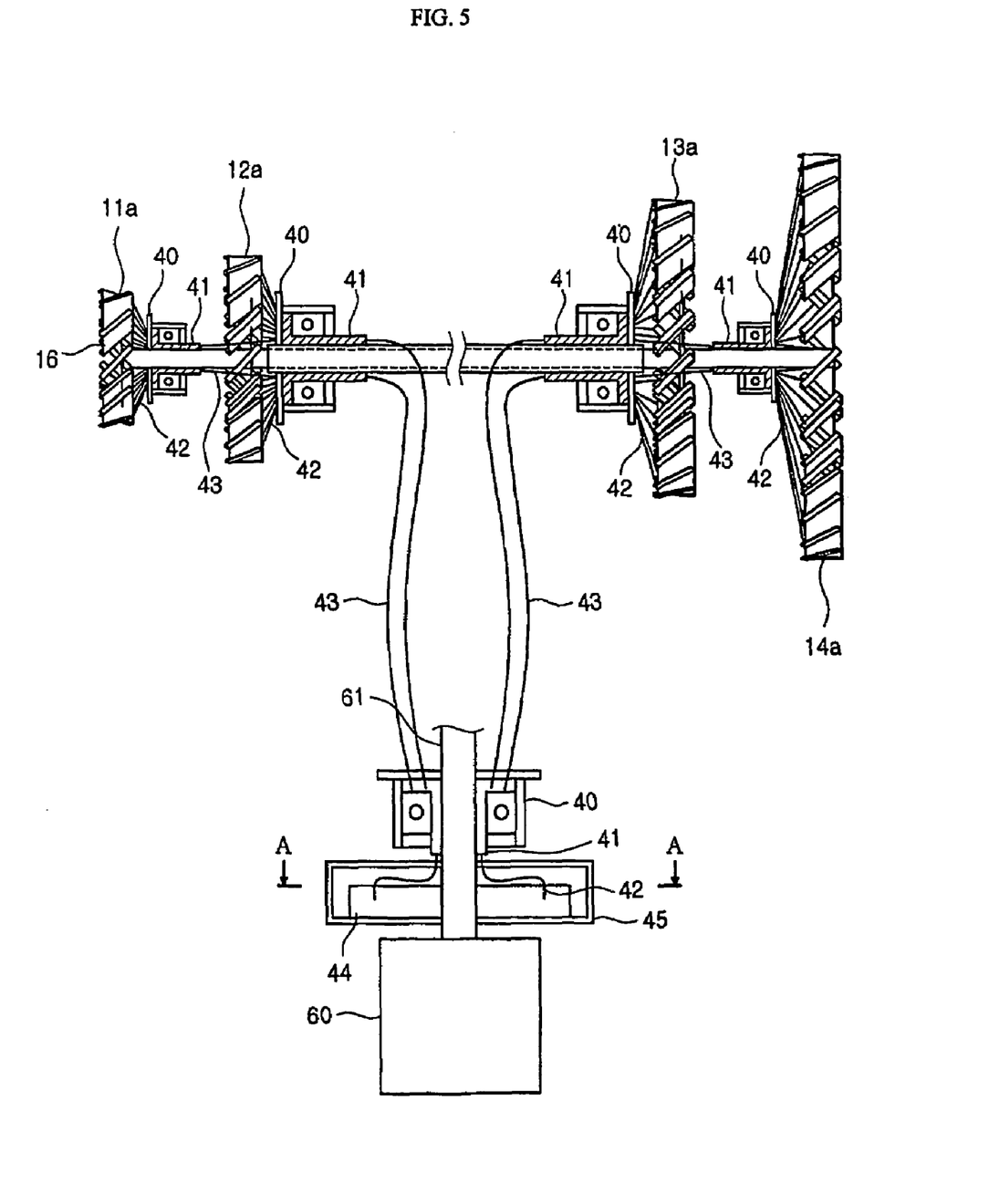
FIG. 5 illustrates the structure of safety means of the wind power generating apparatus of the invention.
Figure 6A:
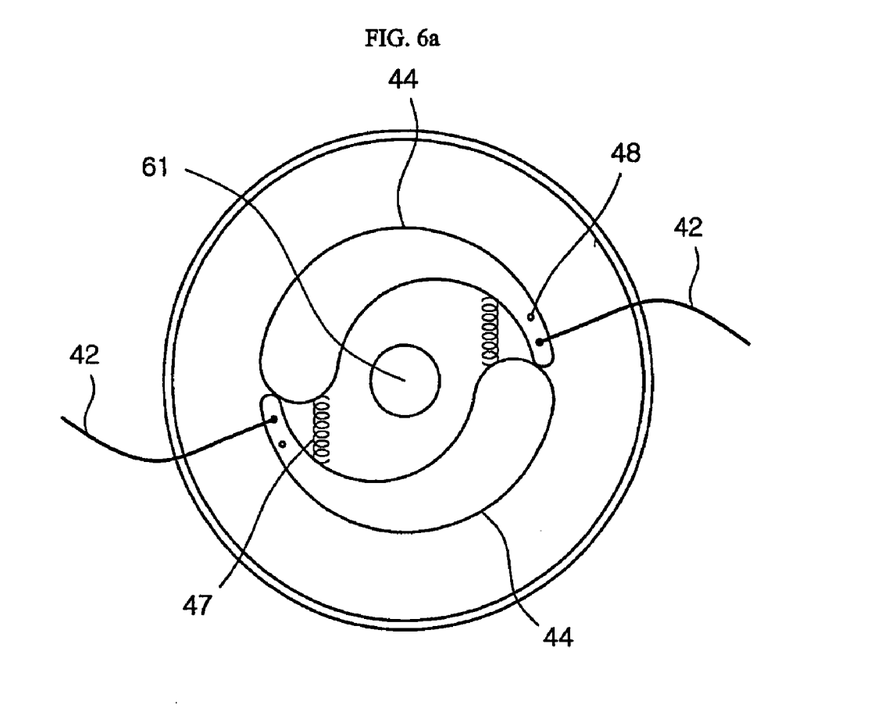
FIGS. 6A and 6B are sectional views taken along a line A—A in FIG. 5 illustrating the operation of a rotor.
Figure 6B:
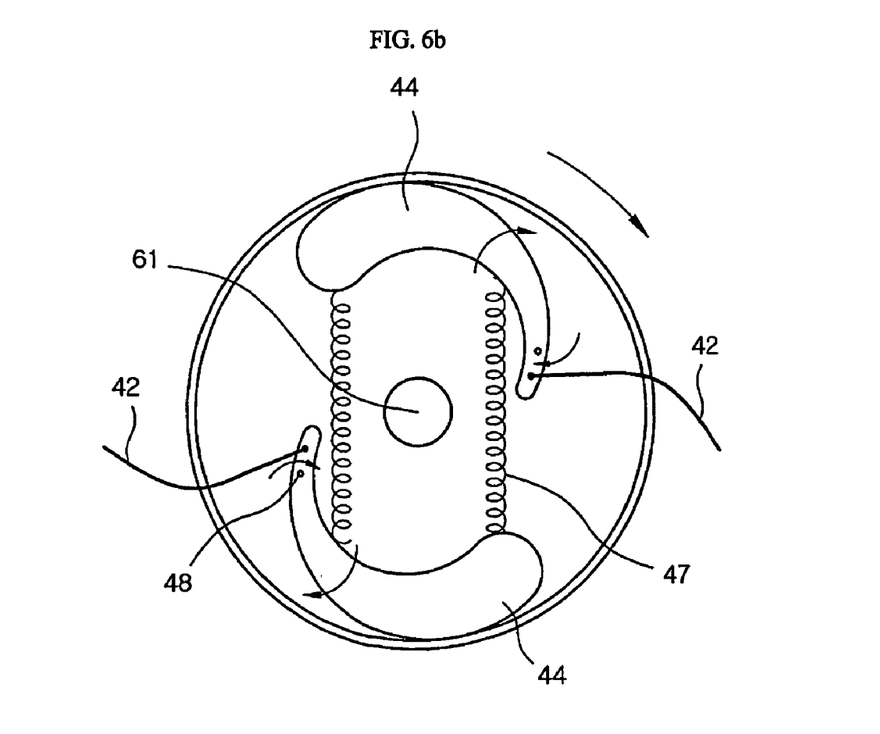
Figure 7:
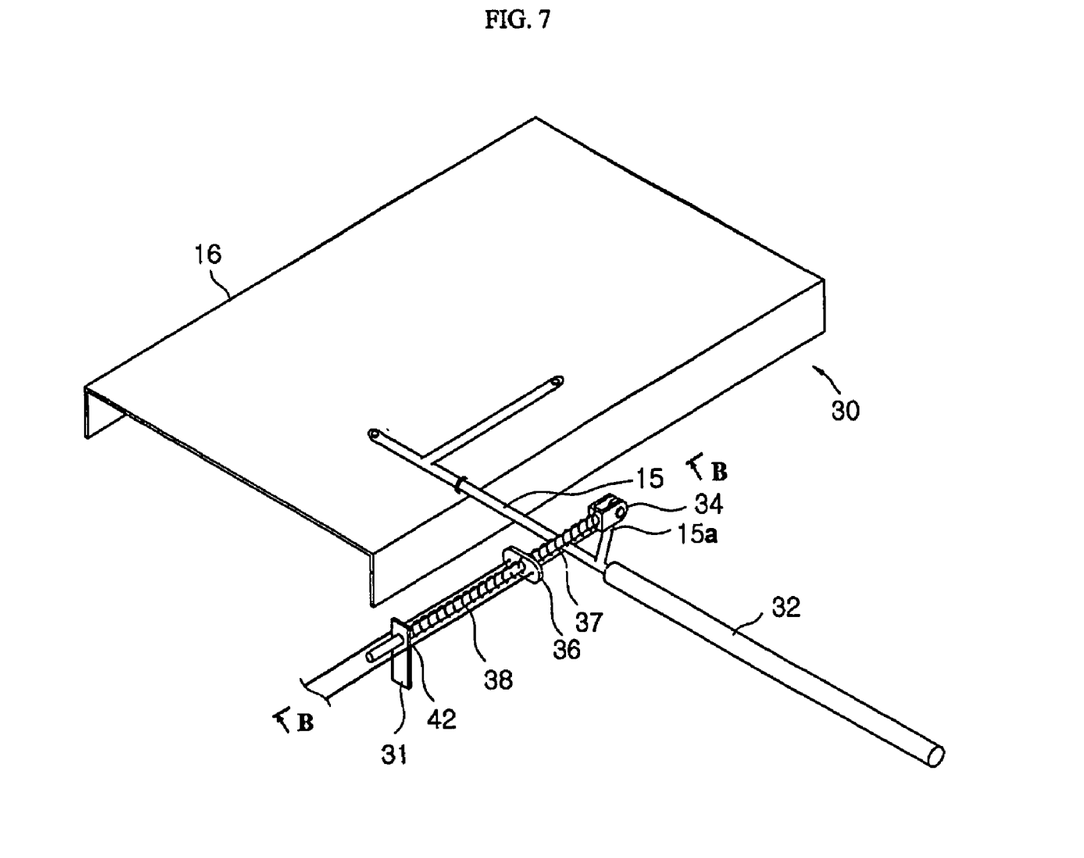
FIG. 7 is a partial expanded perspective view of a rotary wing of the wind power generating apparatus of the invention.
Figure 8:
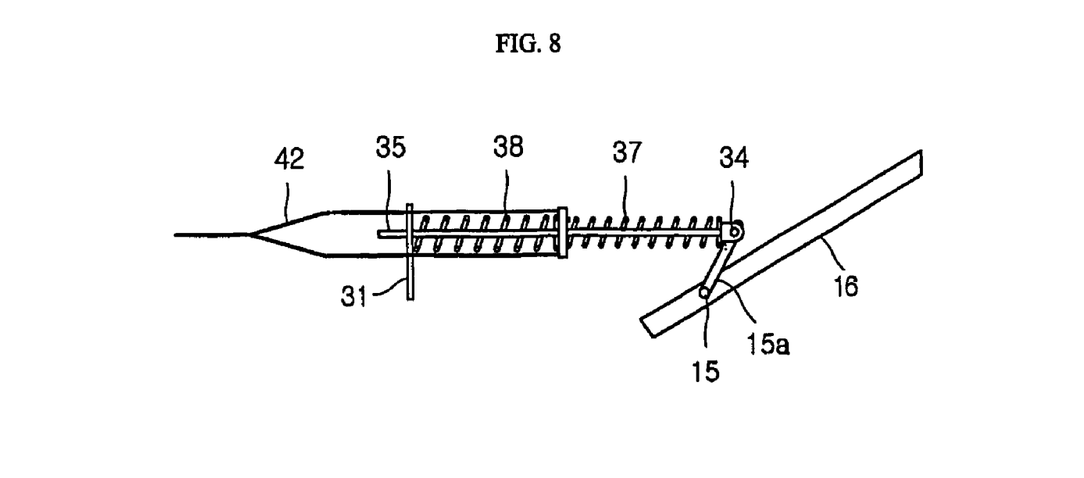
FIG. 8 is a sectional view taken along a line B—B in FIG. 7.
Figure 9A:
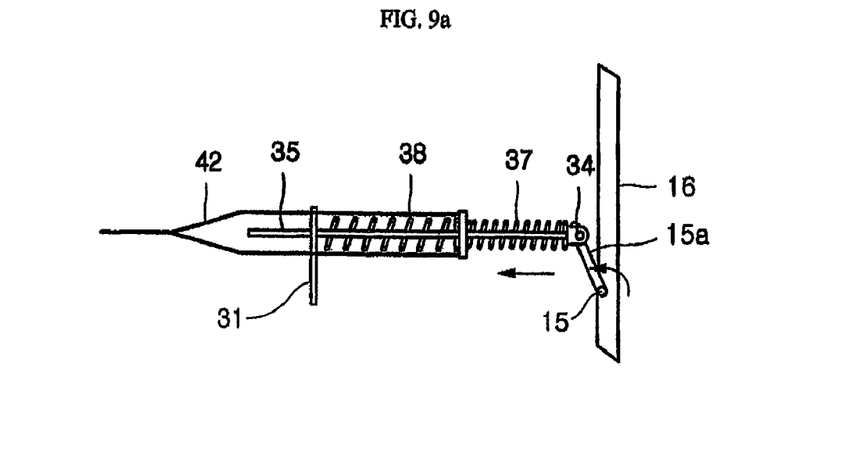
FIGS. 9A and 9B are sectional views illustrating the operation of wing supporting means of the invention.
Figure 9B:
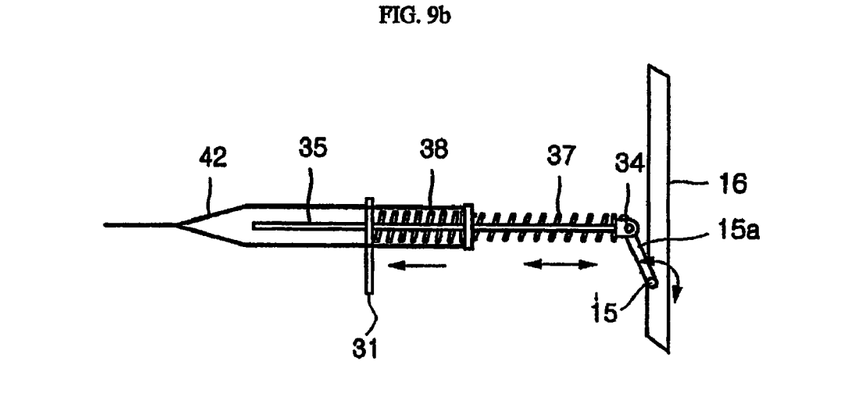
Figure 10:
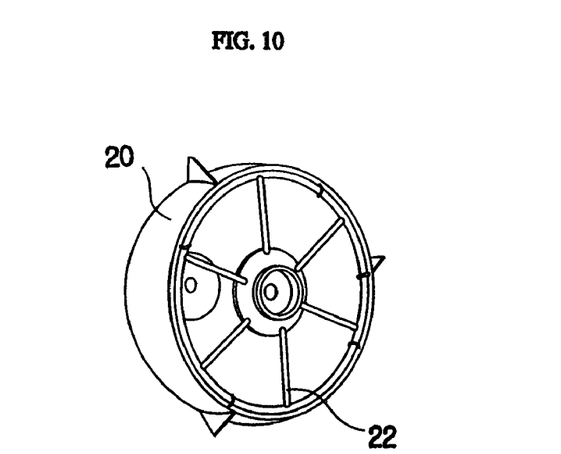
FIG. 10 is a perspective view illustrating a model of a first accelerator cover of the invention.

FIG. 1 is a perspective view of a wind power generating apparatus of the invention, FIG. 2 is an exploded perspective view of the wind power generating apparatus of the invention, FIG. 3 is a partially expanded plan view of FIG. 2, FIG. 4 is a transmission unit of the wind power generating apparatus of the invention, FIG. 5 illustrates the structure of safety means of the wind power generating apparatus of the invention, FIGS. 6A and 6B are sectional views taken along a line A—A in FIG. 5 illustrating the operation of a rotor, FIG. 7 is a partial expanded perspective view of a rotary wing of the wind power generating apparatus of the invention, FIG. 8 is a sectional view taken along a line B—B in FIG. 7, FIGS. 9A and 9B are sectional views illustrating the operation of wing supporting means of the invention, FIG. 10 is a perspective view illustrating a model of a first accelerator cover of the invention.

As shown in the drawings, a wind power generator of the invention is provided with four rotary wings 11a, 12a, 13a and 14a have different rotational radii, and each of the rotary wings 11a to 14a includes a plurality of wing pieces 16 and a plurality of wing spokes 15 connected respectively with the wing pieces 16. First and fourth rotary shafts 11 and 14 each are coupled with one of the rotary wings 11a to 14a and maintain a predetermined distance from each other in a corresponding manner. Second and third rotary shafts 12 and 13 each rotatably receive one of the first and fourth rotary shafts 11 and 14, and are coupled with one of the rotary wings 11a to 14a. First and second accelerator covers 20 and 21 each are disposed around one of the first and fourth rotary shafts 11 and 14 for accelerating and guiding the wind to corresponding ones of the wing pieces 16. Wing piece support means 30 are disposed respectively in the rotary wings 11a and 14a for elastically supporting corresponding ones of the wing pieces 16 according to variation of wind pressure. Safety means are connected with a portion of each of the support means 30 for adjusting the angle of each of the wing pieces 16 at occurrence of blast to prevent the wind from having excessive influence on the each wing piece 16. A transmission unit 50 is connected with the first to fourth rotary shafts 11 to 14 via a gear train for changing rotation rates thereof. A generator 60 serves to receive rotation power from the transmission unit 50 via a shaft 61 which is meshed with one portion of the transmission unit 50 to generate electric power. A transmission unit housing 50a contains the transmission unit 50, and the shaft 61 of the generator 60 is extended rotatably through the transmission unit housing 50a. A base frame 70 serves to support a lower portion of the transmission unit housing 50a and to mount the generator 60 at a predetermined position.

The first to fourth rotary shafts 11 to 14 are supported by bearings B while the first rotary shaft 11 is received rotatably into the second rotary shaft 12 and the fourth rotary shaft 14 is received rotatably into the third rotary shaft 13.

Each of the first and second accelerator covers 20 and 21 has tapered circular tubes 23 which are arranged in a conical configuration to accelerate and guide the wind to the respective wing pieces 16 in the first and second rotary wings 11a and 12a and the third and fourth rotary wings 13a and 14a. The circular tubes 23 are fixed to conical support members 22.

In other words, the first accelerator cover 20 distributes the accelerated wind to the rotary wings 11a and 12a with different radii of rotation and the second accelerator cover 21 also distributes the accelerated wind to the rotary wings 13a and 14a in order to obtain effective rotation power.

The wing piece support means 30 includes a fixing tube 32 shaped in a tube such that each of the wing spokes 15 can be rotatably inserted into the same, a movable rod 35 coupled with an extension piece 15*a* extended from a portion of the each spoke 15 via a hinge 34, first and second springs 37 and 38 fitted around the movable rod 35 for absorbing impact applied to the each wing spoke 15, and a movable piece 36 fitted around the movable rod 35 between the first and second springs 37 and 38 and connected with a portion of the safety means via steel wires 42.

In addition, one end of the movable rod 35 is fixed to a support plate 31, which is fixed to a portion of another fixing tube 32.

The wing piece support means 30 are provided to elastically support pivoting of the wing pieces 16 according to variation of wind pressure and to effectively utilize the wind.

The first and second springs 37 and 38 have diameters different from each other. The first spring 37 supports pivoting of the each wing piece 16 mounted on the wing spoke 15 at normal times with lower wind velocity. As wind velocity increases e.g. owing to storm, the safety means pull the steel wires 42 connected to the movable plate 36 so that the second spring 38 is compressed and the first spring 37 is drawn so as to support pivoting of the each wing piece 16 with a sufficient amount of elastic force.

The safety means for pulling the steel wires 42 include a plurality of hollow fixing members 40 for receiving the wires 42 connected to the movable pieces 36 and for receiving the first to fourth rotary shafts 11 to 14 and the shaft 61, a plurality of movable members 41 being movable up/down within the fixing members 40 and for fixing terminal ends of the steel wires 42 inserted into the fixing members 40, a plurality of rotors 44 connected via the wires 42 with a bottom of the movable member 41, which is disposed around the shaft 61, and connected via elastic members 47 with each other to radially move resulting from centrifugal force during high-speed rotation, a rotor housing 45 disposed around the shaft 61 for containing the plurality of rotors 44 and connected with the rotors 44 via hinge shafts 48, and connector steel wires 43 for allowing cooperative motion of the plurality of movable members 41 according to movement of the rotors 44.

When the rotor housing 45 around the shaft 61 rotates at high speed resulting from blast, the rotors 44 move radially to the outside under centrifugal force so that the steel wires 42, the connector steel wires 43 and the movable members 41 pull the movable pieces 36 of the support means 30.

The rotors 44 are preferably made of heavy metal so that the rotors 44 can move radially to the outside only during high-speed rotation of the rotor housing 45.

The transmission unit 50 includes a plurality of drive gears 51, 52, 53 and 54 having diameters different from one another and disposed respectively on the first to fourth rotary shafts 11 to 14 which separately rotate, a plurality of rotatable driven gears 55, 56, 57 and 58 meshed respectively with the plurality of drive gears 51 to 54, a driven shaft 59 connecting the plurality of driven gears 55 to 58, and bevel gears 62 for transmitting the rotation power of the driven shaft 59 to the shaft 61.

The transmission unit 50 transmits the rotation power of the drive gears 51 to 54 which rotate in their own respective rates to the shaft 61 so that the generator 60 can generate electric power.

Explaining the operation and effect of the invention having the above construction, the wind is accelerated while passing through the first accelerator cover 20 and the accelerated wind is distributed by the first accelerator cover 20.

That is, the wind blowing from a free end is accelerated while passing through the circular tubes 23, which are distributed in a conical configuration and reduced in cross sections, and divided into two directions before the wind is introduced to the wing pieces 16 of the first and second rotary wings 11*a* and 12*a*.

Herein, the first accelerator cover 20 and the first and second rotary wings 11*a* and 12*a* are arranged in a triangular configuration in the order of the first accelerator cover 20 to the second rotary wing set 12*a* so that the wind is concentrated to the wing pieces 16 of the first and second rotary wings 11*a* and 12*a* in order to obtain maximum rotation power.

After being slowed down while passing through the first and second rotary wings 11*a* and 12*a*, the wind is introduced into the second accelerator cover 21, where the wind Is accelerated again according to the operation of the second accelerator cover 21 like that of the first accelerator cover 20.

The wind accelerated while passing through the second accelerator cover 21 is concentrated to the wing pieces 16 in the third and fourth rotary wings 13*a* and 14*a* to turn the same.

The first rotary shaft 11 is extended through the second rotary shaft 12 and the fourth rotary shaft 14 is extended through the third rotary shaft 13 so that the first to fourth rotary shafts 11 to 14 are rotated respectively by the first to fourth rotary wings 11*a* to 14*a* disposed on the respectively rotary shaft 11 to 14 to the radii of rotation different from one another.

Rotation of the first to fourth rotary shafts 11 to 14 turns, at predetermined deceleration ratios, the first to fourth drive gears 51 to 54 disposed respectively on the rotary shafts 11 to 14 and the first to fourth driven gears 55 to 58 meshed respectively with the first to fourth drive gears 51 to 54.

The gears are connected as above to output the rotation power of the first to fourth rotary shafts 11 to 14, which rotate separately, at predetermined deceleration ratios, and the generator 60 is driven 60 via the bevel gear 62 connecting between the driven shaft 59 and the shaft 61.

Since those skilled in the art can readily carry out or generally perform a number of bearings B disposed around the first to the fourth rotary shafts 11 to 14 to smoothen rotation and transmit electric power generated by the generator 60 can be transmitted to a nearby transmission station and/or charge electric power into separate charging means, detailed description thereof will be omitted.

The rotation speed of the first to fourth rotary wings 11*a* to 14*a* increases in a strong wind of high velocity such as storm, in which the wind may particularly Impact the wing pieces 16 which are under direct influence of the wind.

The support means 30 elastically absorb Impact on the wing pieces 16 according to the intensity of impact. In particular, the support means 30 elastically support the wing pieces 16 so that the wing pieces 16 can gradually rotate in a direction parallel to the direction of the wind to utilize the maximum quantity of wind power. When the wind pressure suddenly increases e.g. due to blast, the safety means flexibly adjust the angle of the wing pieces 16.

The operation of the support means 30 will be described in detail referring to FIGS. 7 to 9B. As wind velocity increases, the wing spoke 15 coupled with the wing piece 16 moves laterally.

Then, the movable rod 35 hinged on the extension piece 15*a* of the wing spoke 15 is cooperatively moved laterally, in which the first spring 37 fitted around the movable rod 35 is compressed and drawn via a hinge point 34 to elastically absorb movement of the wing piece 16 and the wing spoke 15.

In this case, the first spring 37 only performs elastic motion to primarily absorb impact applied to the wing piece 16 since the second spring 38 has a larger coil diameter and a smaller value of sagging owing to weight than those of the first spring 37 and the first spring 37 is supported by the second spring 38 and the movable piece 36.

The safety means operate when a strong wind such as storm concentrates to the wing pieces 16. Describing this in reference to FIGS. 5 to 9B, as wind velocity rapidly increases, the first to fourth rotary wings 11a to 14a rotate at high speed so that rotation power is transmitted to the transmission unit 50 and the shaft 61 to turn the rotor housing 45 at high speed.

As the rotor housing 45 rotates at high speed, the rotors 44 therein move radially to the outside in relation to the hinge shafts 48 while pulling the steel wires 42 connected with the rotors 44.

As the rotors 44 pull the steel wires 42, the movable members 41 on the shafts 61 and the plurality of the rotary shafts 11 to 14 are moved downward to pull the movable pieces 36 disposed on the movable members 41 and the movable members 41 so that the second springs 38 are compressed while the first springs 37 return to the loose original position as shown in FIG. 9B.

As the first springs 37 return to the original position, the safety means more effectively support the wing spokes 15 and the wing pieces 16. When wind velocity rapidly increases, the safety means elastically support the wing pieces 16 so that the wing pieces 16 rotate in a direction parallel to the direction of the wind so as to prevent damage of the wind power generating apparatus e.g. under storm.

When the wind returns to normal velocity after storm is over, the safety means counter operate from the above described process so that the first and second springs 37 and 38 return to the original position as shown in FIG. 8 and the first springs 37 repeats elastic movement.

As set forth above, the wind power generating apparatus of the invention accelerates the wind via the first and second accelerator covers 20 and 21 and guides the accelerated wind to wing pieces 16 of the first to fourth rotary wings 11a to 14a, which rotate separately, to reduce load and resistance in relation to the wind occurring when the wind direction is non-uniform thereby realizing effective rotation power. Also the support means 30 and the safety means elastically support the first to fourth rotary wings 11a to 14a according to variation of wind pressure as well as support the wing pieces 16 so that the wing pieces 16 gradually rotate in a direction parallel to the direction of the wind. As a result, the Invention can enhance the efficiency of wind power generation as well as prevent damage of the wind power generating apparatus.

While the present invention has been described with reference to the particular illustrative embodiments, those skilled in the art can change or modify the embodiments without departing from the scope and spirit of the present invention.

Accordingly, the scope of the invention is not restricted to the above-described embodiments but shall be defined by the appended claims and equivalents thereof.

INDUSTRIAL APPLICABILITY

As set forth above, the present invention accelerates the velocity of the wind via the accelerator covers as well as distributes the accelerated wind to the wing pieces in order to effectively turn the rotary wings having the respective radii of rotation different from one another.

The rotary wings rotate separately according to the direction of the wind to reduce load and resistance in relation to the wind, thereby maximizing rotation power and enhancing the efficiency of power generation.

Further, the support means and the safety means elastically support the rotary wings so that the rotary wings may not be damage by a strong wind such as storm. In particular, the support and safety means support the wing pieces under direct influence of the wind so that the wing pieces can gradually rotate according to the intensity of the wind without sudden rotation In a direction parallel to the direction of the wind. As a result, the present invention can advantageously maximize the use of wind power.

The invention claimed is:

1. A wind power generating apparatus, comprising:
 a plurality of rotary wings, each rotary wing comprising:
  a plurality of wing spokes, each wing spoke having a first spoke end and a second spoke end, the length of each wing spoke being elongated therebetween; and
  a plurality of wing pieces, each wing piece being connected to one of the second spoke ends,
   wherein the lengths of all wing spokes in one rotary wing are substantially the same, and
   wherein the lengths of all wing spokes in one rotary wing is different from the lengths of the wing spokes in another one of the plurality of rotary wings;
 a plurality of rotary shafts, each rotary shaft having a first shaft end and a second shaft end and the length of the rotary shaft being elongated therebetween,
  wherein all first spoke ends of each of the plurality of rotary wings are coupled to a respective one of the plurality of rotary shafts,
  wherein the plurality of rotary shafts are elongated linearly by connecting the first end of one rotary shaft to the second end of another rotary shaft, and
  wherein the linearly elongated rotary shafts form a common axis for the plurality of rotary wings, such that the plurality of rotary wings rotate with respect to the common axis in response to an external force including wind applied to the rotary wings having the wing pieces;
 an accelerator cover connected to one of the two ends of the linearly elongated rotary shafts,
  wherein the accelerator cover guides the external force in the form of wind to the wing pieces;
 wing piece support means connected to each wing piece for elastically supporting pivoting of the wing piece according to wind pressure variation;
 safety means connected to each wing piece support means for adjusting the angle of each wing piece according to the wind force being applied to the wing piece to prevent the wind from exerting excessive influence on the wing piece;
 a transmission unit connected to the linearly elongated rotary shafts;
 a generator connected to the transmission unit via a generator shaft for receiving the force from the transmission unit and generating electric power;
 a transmission unit housing for containing the transmission unit and the generator shaft; and
 a base frame for supporting the transmission unit housing at a predetermined position.

2. The wind power generating apparatus as set forth in claim 1, wherein the accelerator cover is cone-shaped.

* * * * *